United States Patent [19]

Takada

[11] 4,350,370
[45] Sep. 21, 1982

[54] BELT SHIFTING MECHANISM FOR A PASSIVE VEHICLE RESTRAINT BELT SYSTEM

[76] Inventor: Juichiro Takada, 3-12-1 Shinmachi, Setagayaku, Tokyo, Japan

[21] Appl. No.: 210,140

[22] Filed: Nov. 24, 1980

[30] Foreign Application Priority Data

Nov. 27, 1979 [JP] Japan .......................... 54-163222[U]

[51] Int. Cl.³ .............................................. B60R 21/02
[52] U.S. Cl. .................................................... 280/804
[58] Field of Search ........................ 280/804, 803, 802

[56] References Cited

U.S. PATENT DOCUMENTS

| | | | |
|---|---|---|---|
| 3,902,736 | 9/1975 | Bluggel et al. | 280/804 |
| 4,241,941 | 12/1980 | Yamamoto | 280/804 |
| 4,249,755 | 2/1981 | Takada | 280/804 |
| 4,262,934 | 4/1981 | Takada | 280/804 |
| 4,299,408 | 11/1981 | Takada | 280/804 |

*Primary Examiner*—Robert R. Song

*Attorney, Agent, or Firm*—Brumbaugh, Graves, Donohue & Raymond

[57] ABSTRACT

A belt shifting mechanism in a passive restraint belt system including a link rod and a paired slider mounted within a slide rail which is mounted on the inner face of a vehicle door, the paired slider having a front and rear slider, the link rod being attached at one end to the vehicle body adjacent the front edge of the vehicle door opening and at the other end to the front slider, the rear slider having connected thereto a drive member which in response to the motion of the rear slider causes a restraint belt to shift between a restraining position and a release position, the front and rear slider being releasably attached to each other by a releasing device, the releasing device when the vehicle door is partially opened from a closed position releasing the front slider from the rear slider such that only the front slider is caused by the link rod to slide forwardly beyond the predetermined point in response to the opening of the door from a partially opened to a fully opened position.

10 Claims, 6 Drawing Figures

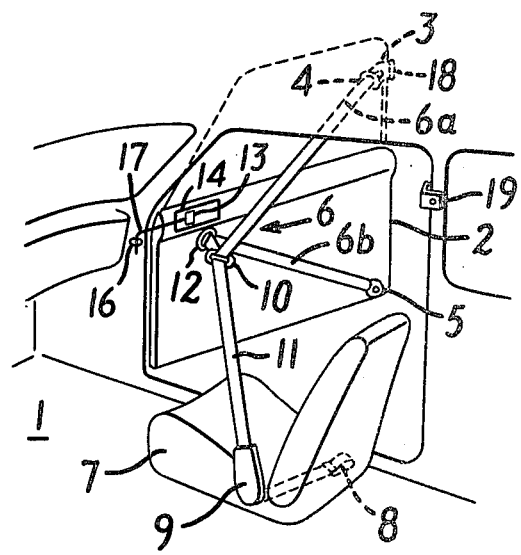
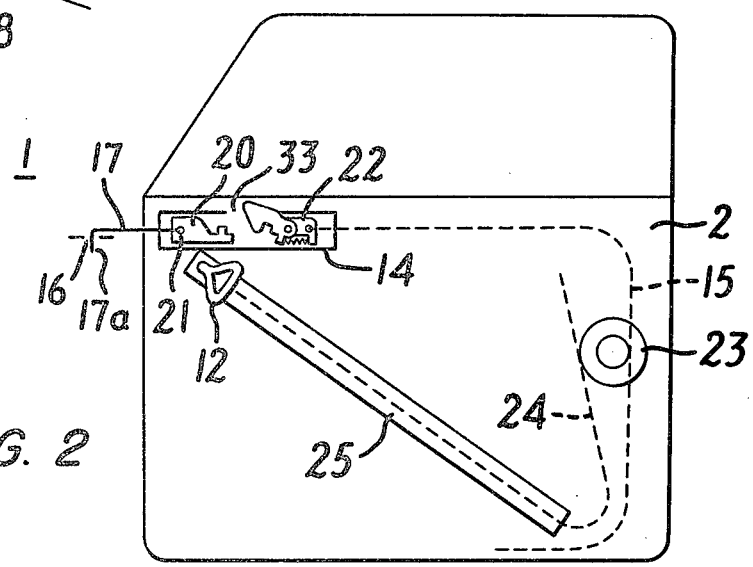
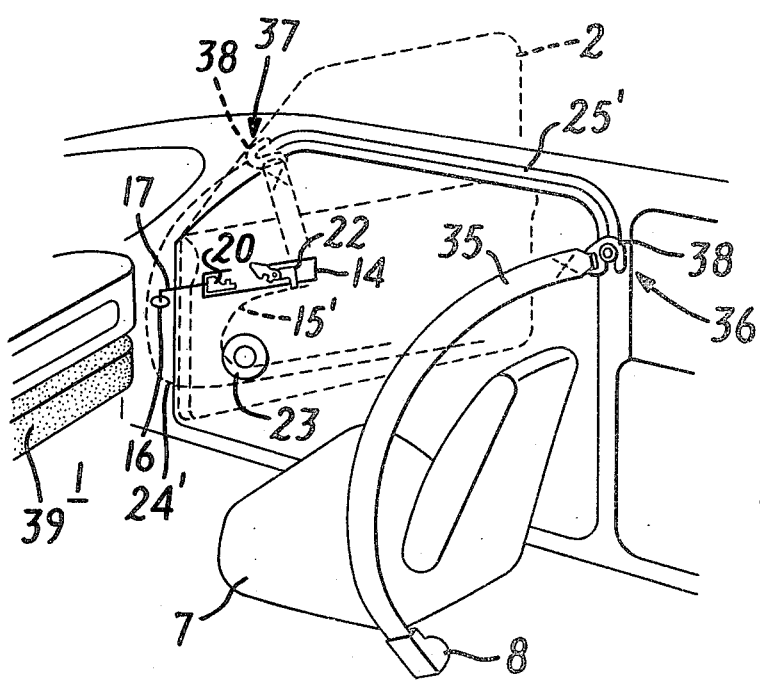
FIG. 1
FIG. 2
FIG. 3

BELT SHIFTING MECHANISM FOR A PASSIVE VEHICLE RESTRAINT BELT SYSTEM

FIELD OF THE INVENTION

This invention relates to an improvement in a passive restraint belt system, and particularly to a passive system that employs a unique belt shifting mechanism to shift the belt from an occupant restraining position to an occupant releasing position in response to a partial opening of the vehicle door.

BACKGROUND OF THE INVENTION

Various passive occupant restraint belt systems have been proposed in which a seat belt is arranged to move automatically from an occupant restraining position to an occupant releasing position. While such systems generally employ means for shifting the belt away from the body of the vehicle occupant, and hence permit the occupant to enter and leave the vehicle, the particular means so employed vary widely. For example, electrical sensing devices and motors may accomplish the desired shifting function but only at relatively great expense.

Other systems, such as disclosed in co-pending U.S. patent application Ser. No. 195,726 filed Oct. 10, 1980, which corresponds to Japanese Utility Model Registration Application 54-143328 filed Oct. 18, 1979, employ mechanical linkages which, in response to the opening and closing of the vehicle door, cause the seat belt to move from a restraining to a non-restraining position. The present invention is of this type.

In passive restraint belt systems which move in response to the opening and closing of the vehicle door, it has also been proposed to provide for full movement of the system even though the vehicle door may be opened only partially. This is because there are often encountered situations, such as on narrow roadways or in tight parking spaces, where the occupant is unable to fully open the vehicle in order to enter or leave the vehicle. In such systems, however, relatively complicated, costly or fragile mechanisms have heretofore been employed.

The relative complexity of systems which are fully responsive to only partial door movement is caused primarily by the fact that lost-motion couplings must be included for permitting the door to move from a partially open to fully open position without further affecting the movement or operation of the seat belt system. Moreover, since the mechanical linkages for detecting and responding to door movement are commonly located at the lower portion of the hinged (i.e. front) edge of the vehicle door, various motion amplifiers have been required in order to obtain the desired seat belt movement in response to the relatively small displacement of the front door edge as the door is partially opened.

The present invention is, therefore, directed to a passive seat belt system which includes these features and which is at the same time relatively simple, inexpensive, and dependable.

SUMMARY OF THE INVENTION

There is provided, according to the present invention, a belt shifting mechanism for use in a passive vehicle restraint belt system which utilizes and is responsive to the movement of the vehicle door upon opening and closing. The shifting mechanism comprises a link rod, a slider and a slide rail within which the slide is mounted. The slide rail is preferably mounted on the inner face of the vehicle door such that the link rod, which is attached at one end to the vehicle door frame and at the other end to the slider in the slide rail, moves the slider as the vehicle door is opened and closed.

A unique feature of the present invention is the slider which is actually a pair of sliders releasably attached to each other. The front slider is attached to the link rod and moves forward on the slide rail as the door is moved from a closed to a fully open position. The rear slider, on the other hand, remains attached to and moves with the front slider only during the initial movement of the door during opening. As the door reaches a predetermined partially opened position, the rear slider disengages from the front slider and hence is no longer influenced by the continued movement of the link rod and front slider as the door is fully opened. It is this disengagement feature which comprises the relatively simple and dependable lost-motion coupling of the present invention.

The rear slider is connected to a drive member, which, preferably through a motion amplifier mechanism, causes a movable ring or the like to shift the seat belt from an occupant restraining to an occupant releasing position.

The motion amplifier mechanism can be a gear assembly with which an input drive member cooperates. In the preferred embodiment, the input drive member is a racked flexible wire which is supported within a guide tube and which engages the teeth of a gear in the motion amplifier. Similarly, an output drive member, again preferably a racked wire, engages another gear in the motion amplifier and in turn acts upon the movable ring so as to shift the seat belt.

Again looking to the preferred embodiment, the output drive member from the amplifier mechanism is connected to and drives a slidable belt guide located in a slide on the inner face of the vehicle door. The belt guide shifts the point of the belt attachment to the door from an occupant restraining position at the lower rear corner of the door to an occupant releasing position at the forward middle portion of the door.

In another embodiment a slidable belt guide or anchor is located on the vehicle body adjacent the upper door edge such that the belt end (in this case a shoulder belt) moves from a restraining position at the upper rear corner of the door to a releasing position at the upper front corner of the door. The output drive member in this embodiment passes from the amplifier mechanism in the door through the front edge of the door and into the front door frame of the vehicle body, and thence upwardly along the front door frame to the belt guide or anchor mounted in a slide positioned along the upper door frame.

DESCRIPTION OF THE DRAWINGS

FIG. 1 is a pictorial view of a passive restraint belt system which may include the belt shifting mechanism of the present invention;

FIG. 2 is a schematic illustration of the belt shifting mechanism according to the invention;

FIG. 3 is a pictorial view of another embodiment of a passive restraint belt system including the belt shifting mechanism according to the invention and FIGS. 4, 5 and 6 are schematic illustrations of three different positions of a lost motion coupling for use in the belt shifting mechanism according to the present invention.

DESCRIPTION OF EXEMPLARY EMBODIMENTS

Figure 4:
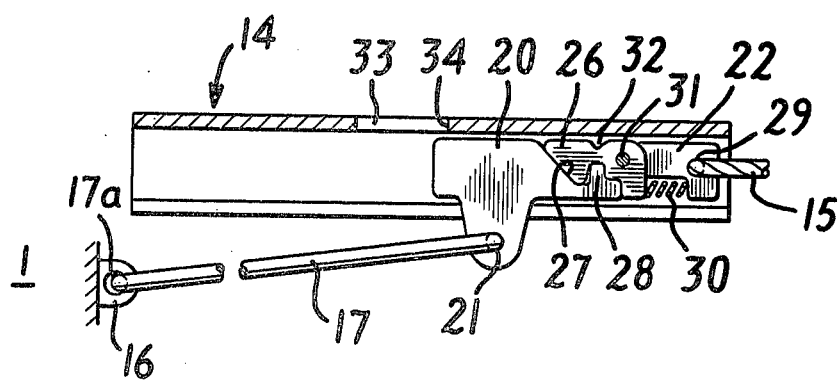

The present invention is particularly directed to a belt shifting mechanism for use in passive restraint belt system such as is depicted in FIG. 1. Looking to FIG. 1, which depicts a belt system similar to that disclosed in the above-mentioned co-pending U.S. patent application Ser. No. 195,726, filed Oct. 10, 1980 (corresponding to Japanese Utility Model Registration Application 54-143328), there is shown a continuous seat belt 6 having a shoulder section 6a and a lap section 6b. The shoulder section 6a is releasably attacked to the top rear corner of the door 2 by means of a buckle 3 and a tongue-plate 4. The other end of the belt, i.e. the lap belt section 6b, is attached to the lower corner of the door 2 by means of an anchor 5 or by some other appropriate means of attachment (e.g. a retractor).

The belt 6 has intermediately serial point of its both sections, shoulder- and lap-engaged with one end of a control belt 11 by means of a slide ring 10 through which the belt 6 passes. The other end of the control belt 11 is anchored at the vehicle floor inboard of and behind the vehicle seat 7, for example by means of a belt guide 9 and an emergency locking retractor 8.

So as to shift the belt 6 from an occupant restraining to an occupant releasing position, a guide-ring 12 is mounted on the inner face of the vehicle door 2 and belt 6 is slidably passed therethrough. The guide-ring 12 is mounted on a guide rail 25 (depicted in FIG. 2) such that the ring may be moved from the lower rear corner of the vehicle door (occupant restraining position) to the front middle of the door (occupant releasing position). The guide-ring is moved by a drive member 15 which in turn is driven by a slider 13 which moves within a slide 14 in response to a link rod 17. The link rod 17 is attached at one end to the front portion of the slide 13 on the vehicle door and at the other end to a coupling 16 on the vehicle body. The coupling 16 may be arranged (e.g. a spring coupling) so as to release the rod 17 if it is pulled with a high force so that in the event that the vehicle door or the shifting mechanism is damaged in an accident, the shifting mechanism will not interfere with the opening of the vehicle door.

A door frame anchor 19 may be provided so as to engage an anchor 18 on the door 2 so as to increase the ability of the belt 6 to withstand loads which may be experienced during a collison or other emergency.

In operation, when the door in FIG. 1 is opened, the link rod 17 pulls the slider 13 forward within the slide 14. The movement of the slider 13 is translated through a drive member and motion amplifier (not shown in FIG. 1 but discussed in detail below) to the guide-ring 12 which moves from the occupant restraining position at the lower rear edge of the door to the occupant releasing position at the front middle of the door.

As pointed out above, it is an important feature of the present invention that the seat belt 6 be movable completely to the occupant releasing position in response to only a partial opening of the vehicle door. In order to accomplish this, there is provided according to the invention a lost motion coupling (depicted in FIGS. 4-6)preferably in combination with a motion amplifier (depicted in FIG. 2).

Referring first to the motion amplifier of FIG. 2, the rear portion 22 of the slider is attached to input drive member 15 which is preferably a flexible racked or toothed wire. The racked wire is supported within a guide tube (not shown) and engages an input gear wheel of motion amplifier 23. The input gear wheel is smaller than and coaxial with a larger output gear wheel. As the input gear wheel is caused to rotate by input drive member 15, the input ger wheel causes the larger output gear wheel to rotate at the same angular velocity as the input wheel and hence at a greater surface velocity. Gears on the outer edge of the output gear engage output drive member 24 which, like input drive member 15, is a racked or toothed wire. The output drive member in turn engages guide-ring 12 mounted on guide rail 25.

It will thus be apparent that as the vehicle door is opened, the input drive gear wheel is caused to rotate by the input drive member. The output drive member is thereby driven by the output gear wheel and forces the guide-ring 12 forwardly and upwardly along the guide rail 25. The movement of the guide-ring in a forward and upward direction on the inner face of the vehicle door causes the lap and shoulder portions of belt 6 to move away from the occupant and thus permits easy ingress to and egress from the vehicle.

By utilizing the motion amplifier mechanism, a mere partial (e.g. about half) opening of the vehicle door is sufficient to cause the guide-ring to travel the full length of the guide rail. It is necessary, therefore, to provide a lost-motion coupling so as to permit the vehicle door to be opened completely without damaging the belt shifting mechanism. Such a lost-motion coupling is depicted in FIGS. 4-6.

Looking to FIG. 4 (which depicts the lost-motion coupling in the position assumed when the vehicle door is closed or opened less than an amount sufficient to cause complete movement of the guide-ring forward in the guide rail), the link rod 17 is attached at one end to anchor 16 on the vehicle body and at the other end to front slider 20. In this regard, the slider 13 shown in FIG. 1 is actually a pair of sliders, i.e. front slider 20 and rear slider 22, releasably connected to each other by means of connector 26. Front slider 20 has a projection 28 located on its rearward face 27, which projection is adapted to engage a corresponding projection 26' on connector 26. Connector 26 is rotatable or pivotal about pin 31 or rear slider 22 such that upward or clockwise rotation will cause the projection 26' to disengage projection 28 and hence permit front slider 20 and rear slider 22 to separate.

Rear slider 22 is provided with a compression spring 30 which bears upon connector 26 and forces it to rotate in a clockwise (and hence releasing) direction. Since, however, front slider 20 and connector 26 are held within slide 14, the top portion of slide 14 prevents connector 26 from rotating and releasing the projection on front slider 20. The front and rear sliders thus remain engaged, and thereby move in conjunction with one another, at least so long as the door is not opened to the predetermined partially opened position wherein the motion amplifier causes the guide ring 12 to completely shift the seat belt to an occupant releasing position.

Figure 5:
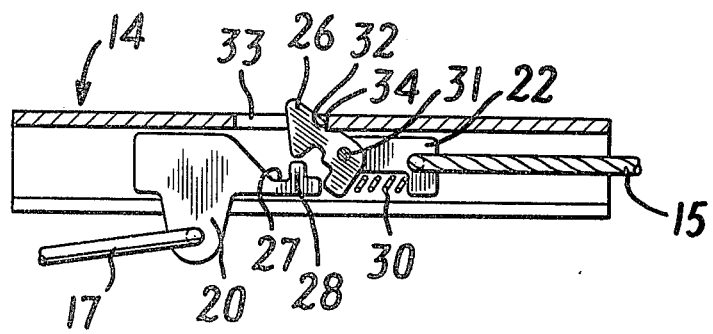
Figure 6:
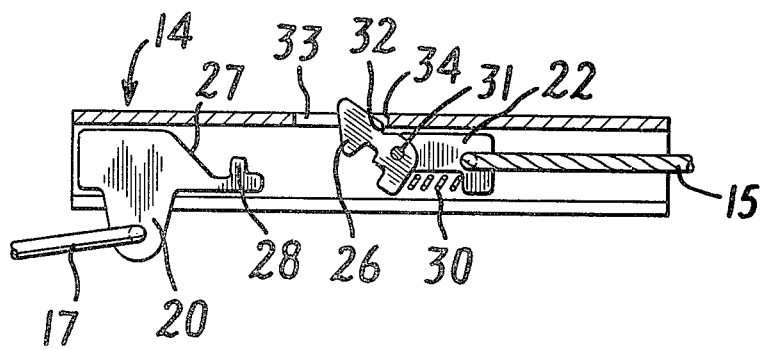

However, when the door reaches this predetermined partially opened position, as shown in FIG. 5, the slider 13 has been caused by the link rod 17 to move forward in the slide 14 to a point where there is located an opening 33 in the top portion of slide 14. As this opening is encountered by connector 26, the compression spring 30 causes the connector to rotate in a clockwise direction and to release the projection 28 on front slider 20.

Continued opening of the door causes the link rod 17 to continue to pull the front slider 22 forward in the slide 14 (as shown in FIG. 6). Since front slider 20 is now disengaged from rear slider 22 it no longer influences (and hence does not strain or damage) the belt shifting mechanism.

So as to prevent rear slider 22 from retracting away from the opening 33 upon disengagement (e.g such as otherwise might be caused by a retractor spring in the motion amplifier), there is provided a notch 32 on the top edge of connector 26. When the connector encounters the opening 33 and is thereby permitted to rotate and disengage the front slider 20, this notch engages the rear edge 34 of the opening 33 and thereby restrains rearward movement of the connector 26 and rear slider 22.

When the door is closed, the link rod pushes front slider 20 backward in the slide 14 until it contacts connector 26. A projection 28' on front slider 20 pushes on the lower face of connector 26, causing it to overcome the force of the compression spring 30 and to rotate counterclockwise. The projections 28 and 26' on the front slider and connector, respectively, are caused to reengage and the notch 32 is released from the edge 34. The front and rear sliders 20 and 22 now move together in response to the motion of the link rod 17 and, as the door is completely closed, cause the guide-ring to move to the occupant restraining position.

The belt shifting mechanism according to the invention may also be used in passive restraint belt systems other than as shown in FIG. 1. For example, FIG. 3 shows a passive restraint system embodying the belt shifting mechanism according to the invention. In this system, a single shoulder belt 35 extends from a retractor 8 adjacent the inboard rear corner of the occupant seat to a movable anchor 38 on the vehicle body above the vehicle door. The anchor 38 slides on a rail 25' from an occupant restraining position 36 to an occupant releasing position 37.

As was the case with the system shown in FIG. 3, the belt shifting mechanism, and in particular the movable anchor 38, is moved in response to the partial opening and closing of the vehicle door by a mechanism as shown in FIGS. 4-6. Thus as the door is opened, link rod 17 pulls the front slider 20 within slide 14. While the front slider 20 remains engaged with rear slider 22 (it being apparent that FIG. 3 shows the front and rear slider in a disengaged position), the movement of the sliders 20 and 22 in turn moves input device drive member 15 across a geared motion amplifier 23. The output drive member 24, a racked or toothed wire, from the motion amplifier is passed through the front end portion of the vehicle door and into the vehicle body. The drive member is then passed upwardly along the front door frame until it engages anchor 38. By this arrangement it is easily seen how the seat belt is shifted between an occupant restraining position and an occupant releasing position by the opening and closing of the vehicle door.

An additional and optional feature of the system shown in FIG. 3 is knee-bolster 39 in front of the seat 7 so as to protect the occupant's legs. This feature is particularly desirable in the restraint system of FIG. 3 in that there is no seat belt specifically adapted to restrain the lower portion of the occupant's body.

It will be appreciated from the foregoing that there is provided according to the invention a belt shifting mechanism for use in a variety of passive restraint systems. The mechanism according to the invention is relatively simple, inexpensive and easy to use. Because these factors contribute to the acceptance of passive restraint systems by automobile manufacturers and the riding public, improved passenger safety results.

I claim:

1. A belt shifting mechanism for use in a passive vehicle restraint belt system comprising a link rod and a paired slider mounted within a slide rail, said paired slider having a front slider and a rear slider, said slide rail being mounted on the inner face of the vehicle door, said link rod being attached at one end to the vehicle body adjacent the front edge of the vehicle door opening and at the other end to the front slider such that in response to the opening and closing of the vehicle door the link rod causes the front slider to slide forwardly and backwardly within the slide rail, said rear slider having attached thereto a drive member which in response to the motion of the rear slider in the slide rail causes an occupant restrain belt to shift between an occupant restraining position and an occupant releasing position, the front slider and the rear slider being releasably attached to each other by releasing means, said releasing means being adapted to cause the front and rear slider to remain attached and to move together when the paired slider is caused by the link rod to move within the rear portion of the slide rail in response to the movement of the vehicle door between a closed position and a partially opened position, and said releasing means being adapted to disengage said front slider and rear slider at a predetermined point on the slide rail forward of said rear portion such that only the front slider is caused by the link rod to slide forwardly in the slide rail beyond the predetermined point in response to the opening of the vehicle door from a partially opened to a fully opened position, said rear slider thereby acting upon said drive member to shift the occupant restraint belt between an occupant restraining position and an occupant releasing position only when the vehicle door is moved between a closed position to a partially opened position.

2. A belt shifting mechanism according to claim 1 wherein said releasing means comprise a connector pivotally attached to the rear slider, said connector having a first projection which hooks over and engages a second projection on the front slider when the connector is pivoted in one direction and which pivots away from and disengages the second projection when the connector is pivoted in the other direction, spring means in the rear slider which bear upon said connector for continuously urging the connector to pivot in said other disengaging direction, restraining means on the slide rail rearward of said predetermined point for preventing the connector from pivoting in said other disengaging direction, said restraining means being terminated or interrupted at said predetermind point such that when the connector slides forwardly in the slide rail and reaches the predetermined point, the connector is pivoted by the spring means so as to disengage the front slider and the rear slider.

3. A belt shifting mechanism according to claim 2 wherein said restraining means comprises a flange along said guide rail.

4. A belt shifting mechanism according to claim 3 wherein said connector has a notch for engaging the forward edge of the flange when the connector is pivoted away from the second projection, said notch when engaged by said edge preventing the rear sliding backwardly in the slide rail.

5. A belt shifting mechanism according to claim 2 wherein said drive member comprises an input drive member, a motion amplifier, and an output drive member operatively connected such that the motion of the input drive member imparted by the rear slider is amplified by the motion amplifier and then transmitted to the output drive member.

6. A belt shifting mechanism according to claim 5 wherein the input member and the output drive member are racked wires which engage geared wheels in the motion amplifier, said input drive member engaging a smaller geared wheel in the motion amplifier and said output member engaging a larger geared wheel in the motion amplifier, the smaller wheel being coaxial with the larger wheel such that the rotation of the smaller wheel in response to the motion of the input drive member rotates the larger wheel at the same angular velocity, the geared circumferential surface of the larger wheel thereby driving the output drive member 7. A belt shifting mechansim according to claim 6 wherein said output drive member drives a slidable belt guide mounted on a slide on the inner face of the vehicle door; said belt guide being slidable from an occupant restraining position at the lower rear corner of the door to an occupant releasing position at the middle forward portion of the door in response to the movement of the door from a closed position to a partially opened position.

8. A belt shifting mechanism according to claim 6 wherein said output member drives a slidable belt guide mounted on a slide on the upper door frame of the vehicle body, said belt guide being slidable from an occupant restraining position adjacent the upper rear corner of the door to an occupant releasing position adjacent the upper front corner of the door in response to the movement of the door from a closed position to a partially opened position.

9. A belt shifting mechanism according to claims 7 or 8 wherein said belt guide is an anchor device.

10. A belt shifting mechanism according to claims 7 or 8 wherein said partially opened position is approximately a half position.

* * * * *

UNITED STATES PATENT AND TRADEMARK OFFICE
CERTIFICATE OF CORRECTION

PATENT NO. : 4,350,370
DATED : September 21, 1982
INVENTOR(S) : Juichiro Takada

It is certified that error appears in the above-identified patent and that said Letters Patent are hereby corrected as shown below:

Column 3, line 7, after "in" insert --a--; line 15, "attacked" should be --attached--; Column 4, line 7, "ger" should be --gear--; Column 5, line 49, delete "device"; line 50, "15" should be --15'--; line 51, "24" should be --24'--; Column 6, line 55, "predetermind" should be --predetermined--; and line 67, after "rear" insert --slider from--.

Signed and Sealed this

First Day of March 1983

[SEAL]

Attest:

GERALD J. MOSSINGHOFF

Attesting Officer    Commissioner of Patents and Trademarks